US012766985B2

(12) United States Patent
Mackenzie et al.

(10) Patent No.: US 12,766,985 B2
(45) Date of Patent: Oct. 20, 2026

(54) MULTI-INPUT ELECTRIC VEHICLE CHARGING SYSTEM

(71) Applicant: FORD GLOBAL TECHNOLOGIES, LLC, Dearborn, MI (US)

(72) Inventors: Kevin Mackenzie, Canton, MI (US); Kevin Higgins, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 18/370,071

(22) Filed: Sep. 19, 2023

(65) Prior Publication Data

US 2025/0091456 A1 Mar. 20, 2025

(51) Int. Cl.
*B60L 53/16* (2019.01)
*B60L 53/22* (2019.01)

(52) U.S. Cl.
CPC ............... *B60L 53/16* (2019.02); *B60L 53/22* (2019.02)

(58) Field of Classification Search
None
See application file for complete search history.

(56) References Cited

U.S. PATENT DOCUMENTS

| | | | | |
|---|---|---|---|---|
| 10,259,336 | B2 | 4/2019 | McQuillen et al. | |
| 10,562,404 | B1 | 2/2020 | Khaligh et al. | |
| 11,597,286 | B2 | 3/2023 | Liu | |
| 2013/0049677 | A1* | 2/2013 | Bouman | B60L 1/02 320/106 |
| 2014/0266042 | A1* | 9/2014 | Storm | B60L 53/14 320/109 |
| 2020/0124653 | A1* | 4/2020 | Rahbari Asr | G06N 3/08 |
| 2021/0146785 | A1* | 5/2021 | Wang | G06N 20/00 |
| 2022/0080849 | A1 | 3/2022 | Shin et al. | |
| 2022/0379744 | A1* | 12/2022 | Gannamaneni | B60L 53/11 |
| 2022/0402390 | A1* | 12/2022 | Smolenaers | H02J 3/322 |

FOREIGN PATENT DOCUMENTS

WO WO-2019161377 A1 * 8/2019 .............. B60L 53/12

* cited by examiner

*Primary Examiner* — Aqeel H Bukhari
(74) *Attorney, Agent, or Firm* — David B. Kelley; Brooks Kushman P.C.

(57) ABSTRACT

A switch arrangement is operable to, as a result of an AC power source being electrically connected with terminals of a charge port of a vehicle, configure the terminals to pass three-phase AC current for an onboard charger of the vehicle, and as a result of a DC power source being connected with some of the terminals, configure the some of the terminals to pass DC current for a traction battery of the vehicle.

16 Claims, 5 Drawing Sheets

500

400

200

300

500

600

MULTI-INPUT ELECTRIC VEHICLE CHARGING SYSTEM

TECHNICAL FIELD

The present disclosure relates to a system for charging an electric vehicle (EV).

BACKGROUND

Electric vehicles rely on a rechargeable high-capacity traction battery for providing electric energy to an electric machine for propulsion. In North America, the Combined Charging System (CCS) Type 1 connector is commonly used to charge electric vehicles. The CCS Type 1 connector combines the Society of Automotive Engineers (SAE) J1722 Type 1 plug with two high-speed DC fast charging pins. The J1722 Type-1 connector is configured to support 240V AC voltage up to 80 A current resulting in a maximum charging power of 19.2 kW.

SUMMARY

A charge system for a vehicle includes a charge port with a plurality of terminals, and a switch arrangement operable to, as a result of an AC power source being electrically connected with the terminals, configure the terminals to pass three-phase AC current for an onboard charger of the vehicle, and as a result of a DC power source being connected with some of the terminals, configure the some of the terminals to pass DC current for a traction battery of the vehicle.

A vehicle includes a traction battery, an onboard charger, a charge port with a plurality of power terminals, and a controller. The controller selectively configures the power terminals to receive three-phase AC power for the onboard charger from an AC power source connected with the charge port, and configures some but not all of the power terminals to receive DC power for the traction battery from a DC power source connected with the charge port.

A method includes, responsive to an AC power source being connected to a charge port of a vehicle, establishing direct electrical paths between power terminals of the charge port and an onboard charger of the vehicle, and responsive to a DC power source being connected to the charge port, establishing direct electrical paths between the power terminals and a traction battery of the vehicle.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system for charging a battery of an electric vehicle. More specifically, the present disclosure proposes a modified connector based on the CCS connector to provide an increased AC charging power.

Figure 1:
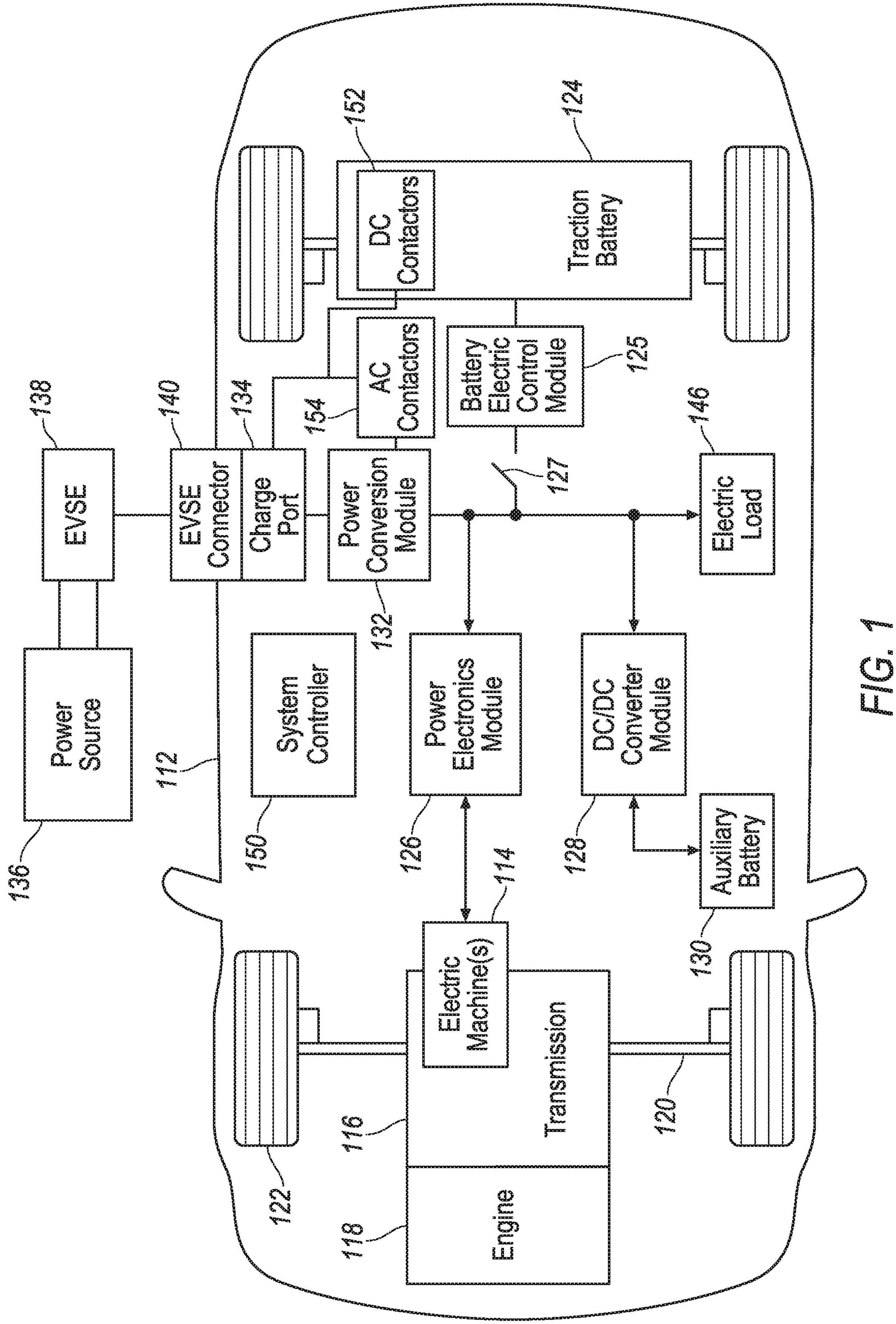
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and braking capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may provide a high voltage DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114.

In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to manage the transfer of energy between the power source 136 and the vehicle 112. The external power source 136 may provide DC and/or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. For instance, the power conversion module 132 may be configured to convert an AC current received from the EVSE 138 into a DC current to charge the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operation of the components. The controllers may communicate via a serial bus (e.g., Controller Area Network (CAN)) or via discrete conductors. A system controller 150 may be present to coordinate the operation of the various components. It is noted that the system controller 150 is used as a general term and may include one or more controller devices configured to perform various operations in the present disclosure. For instance, the system controller 150 may be programmed for charging and discharging operations of the traction battery 124. The system controller 150 may be further programmed to enable a communication function with various entities such as the EVSE 138.

The system controller 150 and/or BECM 125, individually or combined, may be programmed to perform various operations with regard to the traction battery 124. The traction battery 124 may be a rechargeable battery made of one or more rechargeable cells (e.g. lithium-ion cells).

As discussed above, the EVSE connector 140 and the charging port 134 may be any type of port configured to transfer power from the EVSE 138 to the vehicle 112. In the present example, the charging port 134 may be a CCS Type 1 connector in support of a combination of SAE J1722 Type 1 port and a DC fast charging (DCFC) port. The CCS connector may support AC charging and DC charging which brings versatility to the vehicle charging options. Conventionally, when the DC fast charging option is available, the vehicle 112 may receive the DC fast charging current via two DC pins of the DC fast charging port. Although the DC charging may be faster compared with the AC charging, due to limited availability of DC fast charging facilities, the AC charging may be more commonly used. Thus, when the EVSE connector 140 is coupled to the charge port 134, only the SAE J1722 AC port is used to supply AC electricity to the vehicle and the DC port is not in operation in the conventional approach.

Figure 2:
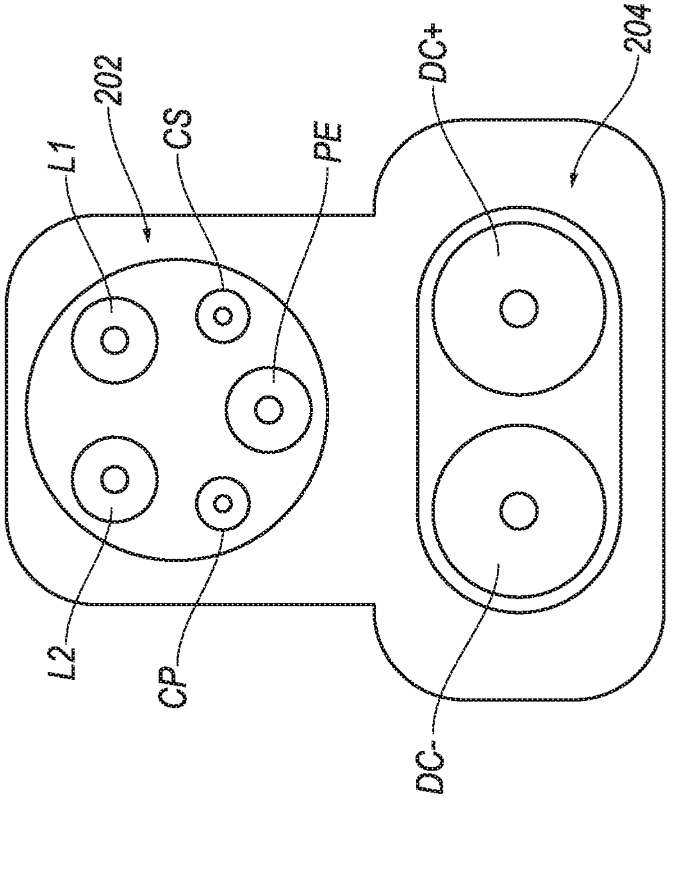
FIG. 2 (PRIOR ART)
FIG. 2 illustrates a pinout diagram of a vehicle charging port of a conventional combined charging system charging port.

As illustrated in FIG. 2, a pinout diagram 200 for a conventional CCS Type 1 connector at the vehicle charge port 134 end is illustrated. The CCS Type 1 connector includes two main components for AC and DC charging. The CCS Type 1 connector includes a SAE J1722 Type 1 connector 202 located on the top for receiving an AC current and a DC fast charging connector 204 located on the bottom for receiving a DC current. The SAE J1722 Type 1 connector 202 includes a first AC line L1 pin for receiving a first AC current from the EVSE 138, and a second AC line L2 pin for receiving a second AC current from the EVSE 138. Both the first and second AC line L1, L2 pins may support up to 80 A Level 2 AC charging. Further, the first and second AC line L1, L2 pins may support a variety of voltages. Conventionally, the Level 2 AC charging utilizes 240V AC current to charge the vehicle. However, the first and second AC line L1, L2 pins of the present disclosure may be configured to support a higher voltage to increase the charging power as higher voltages do not increase heat generated by the cables and harnesses. In cases when the second AC power supply is not available from the EVSE 138, the second AC line L2 may operate as a neutral line instead. The SAE J1722 connector 202 may further include a control status CS pin for receiving pre-insertion signals and a control pilot CP pin for receiving post-insertion signals from the EVSE 138. The SAE J1722 connector 202 may further include an earth pin PE configured to operate as a ground. The DC fast charging connector 204 may include a positive DC pin, DC+, and a negative DC pin, DC−, for receiving DC fast charging current.

Figure 3:
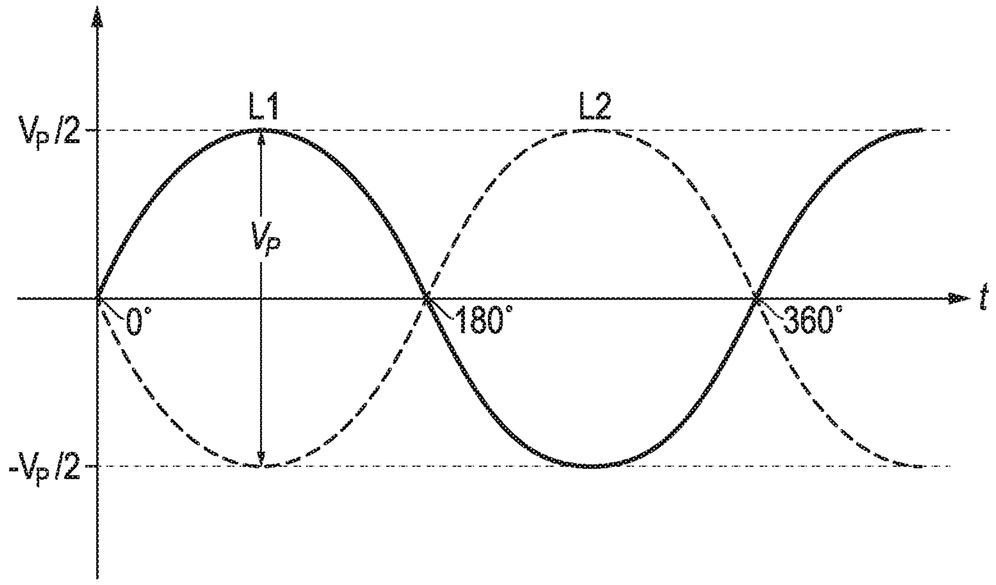
FIG. 3 (PRIOR ART)
FIG. 3 illustrates a waveform diagram of 2-phase AC charging via a conventional AC connector.

FIG. 3 illustrates a waveform diagram 300 of 2-phase AC charging via the SAE J1722 connector 202. With continuing reference to FIG. 2, the two AC charging currents in the present example may be provided via the first and second AC line L1, L2 pins. As illustrated in the waveform diagram 300, the 2-phase AC charging current may include a first AC current supplied via the first AC line L1 having an amplitude of half of the peak voltage Vp/2 and a second AC current supplied via the second AC line L2 having the same amplitude. Both the first and second AC currents are sinusoidal waves and the two currents are offset by half a cycle (i.e.) 180° in phase. Therefore, the maximum voltage across the first and second AC currents is equal to the peak voltage Vp. For instance, in the case of 240V 2-phase Level 2 AC charging scenario, the peak voltage is 240V across the first and second phase currents. During the conventional AC charging process via the CSS charging port 134, although both the AC and DC connectors 202, 204 are connected to EVSE connector 140, only the AC connector 202 is operating and the DCFC connector 204 is not in use.

The present disclosure proposes a system to modify the utilization of the two DCFC pins of the charge port 134 to receive AC current such that overall AC charging power is increased. More specifically, the present disclosure modifies the operation of the vehicle charge port 134 to utilize the DCFC pins to receive an extra phase of AC current in addition to the 2-phase current discussed above without modifying the physical structure of the charge port 134 or the EVSE connector 140. The modified operation may require a modified power control mechanism of both the EVSE 138 and the vehicle 112. The present disclosure focuses on the vehicle side operation and controls.

Figure 4:
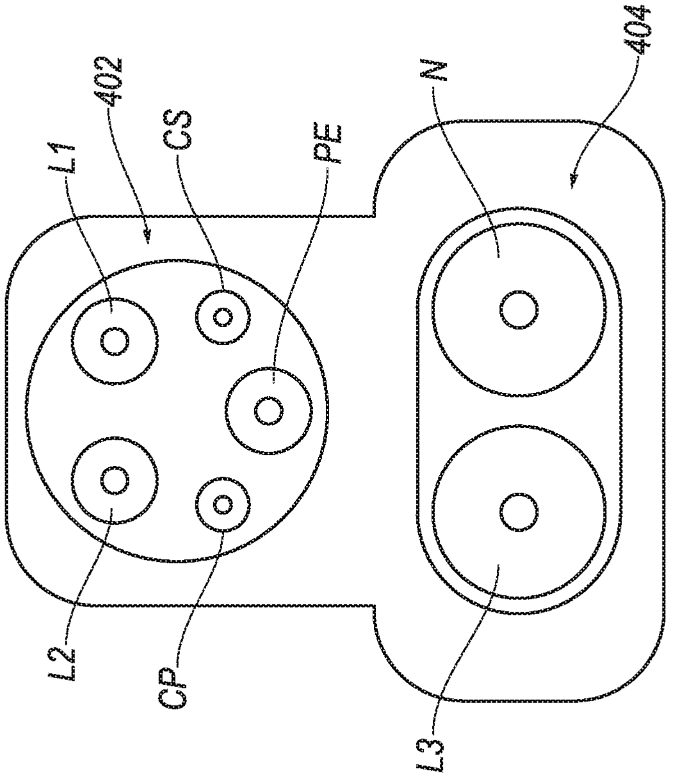
FIG. 4 illustrates a pinout diagram of a vehicle charging port of a modified charging system of the present disclosure.

Referring to FIG. 4, a pinout diagram 400 of a modified vehicle charge port 134 of the present disclosure is illustrated. Compared with the pinout diagram 200 illustrated with reference to FIG. 2, the physical structure of the present disclosure is unmodified from the CCS Type 1 connector. More specifically, the modified vehicle charge port 134 includes a SAE J1722 connector 402 on the top and a modified DC/AC connector 404 (combo connector) in lieu of the DCFC connector on the bottom. Pins of the SAE J1722 connectors are unmodified. However, the modified DC/AC connector 404 may be configured to switch between DC mode and AC mode depending on the specific charger configuration as communicated with the EVSE 138. In the DC mode, the modified DC/AC connector 404 may operate in the conventional manner as the DC connector to receive DC current from the EVSE 138. However, in the AC mode, the modified DC/AC connector 404 may operate as an AC connector to receive a third AC current in addition to the first and second AC lines L1 and L2 of the SAE J7122 connector. More specifically, the modified DC/AC connector 304 may utilize the negative DC pin DC− as a third AC current line L3 configured to receive a third AC current from the EVSE 138. The modified DC/AC connector 404 may utilize the positive DC pin DC+ as a neutral line N to facilitate the AC charging. While operating in the 3-phase AC charging mode, the modified charge port 134 may receive up to three AC currents instead of two AC currents from the EVSE 138.

Figure 5:
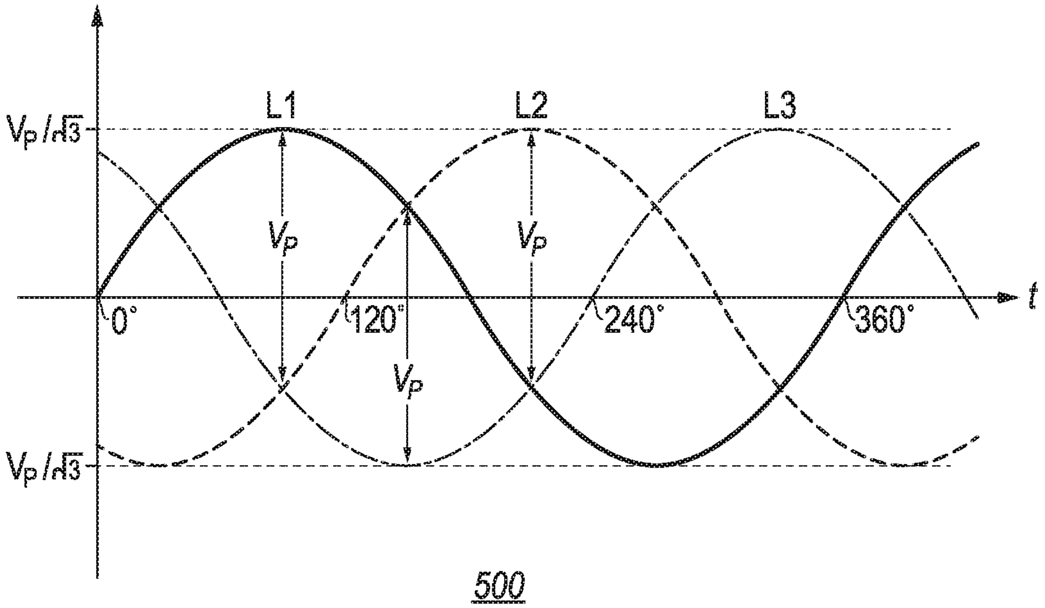
FIG. 5 illustrates a waveform diagram of 3-phase AC charging via a modified vehicle charge port.

FIG. 5 illustrates a waveform diagram 500 of 3-phase AC charging current received via the modified charge port 134. With continuing reference to FIG. 4, the three AC charging currents in the present example may be provided via the first, second and third AC lines L1, L2, L3. As illustrated in the waveform diagram 500, the 3-phase AC charging current may include a first AC current received via the first AC line L1, a second AC current received via the second AC line L2, and a third AC current received via the third AC line L3. The first, second, and third AC currents are sinusoidal waves and offset by one-third of a cycle (i.e.) 120° in phase. Due to the nature of the 3-phase AC current, the voltage amplitude of each individual phase current with reference to neutral is the peak voltage Vp divided by $\sqrt{3}$. The amplitude of the voltage difference between two phases is equal to the peak voltage Vp. For instance, in the case of a 240V 3-phase Level 2 AC charging scenario, the amplitude of the voltage difference between any of the three phase currents is equal to the peak voltage of 240V and the amplitude of voltage in each phase is 139V. In an alternative example, if the EVSE 138 supports 480V 3-phase AC charging, the amplitude of the voltage difference between any of the three phase currents is equal to the peak voltage of 480V and the amplitude of voltage in each phase is 277V. In the later case, the maximum AC charging power supported by the modified charge port 134 is approximately 67 KW (e.g. 480V times 80 A). It is noted that the present disclosure is not limited to the above voltages and higher voltages may be applied to the modified charge port 134 under essentially the same concept.

Although the above description is made with reference to the CCS Type 1 connector, it is noted that the present disclosure is not limited thereto and the present disclosure may be applied to any combination of AC and DC charging connectors under essentially the same concept.

Referring back to FIG. 1, the vehicle 112 may further include switches and a contactor controlled by the system controller 150 and/or BECM 125 to switch between the DC and AC charging mode. In the present example, the modified DC/AC connector 404 may be connected to the traction battery 124 via a DC contactor 152 and to the power conversion module 132 via an AC contactor 154. The AC connector 402 (e.g. the SAE J1722 Type 1 connector) of the modified charge port 134 may be connected to the power conversion module 132 directly without going through the AC contactor 154. In the DC charging mode, the AC contactor 154 is open and the DC contactor 152 is closed such that the DC current received by the DC/AC connector 404 is directly supplied to the traction battery 124 without going through the power conversion module 132. In the AC charging mode, the DC contactor 152 is open to separate the AC power from directly reaching the traction battery. The AC contactor 154 is closed to allow the third AC line L3 and neutral line N to connect to the power conversion module together with the AC charging connector 402. Operations of the AC contactors 154 and DC contactors 152 may be controlled by the system controller and/or BECM 125.

Figure 6:
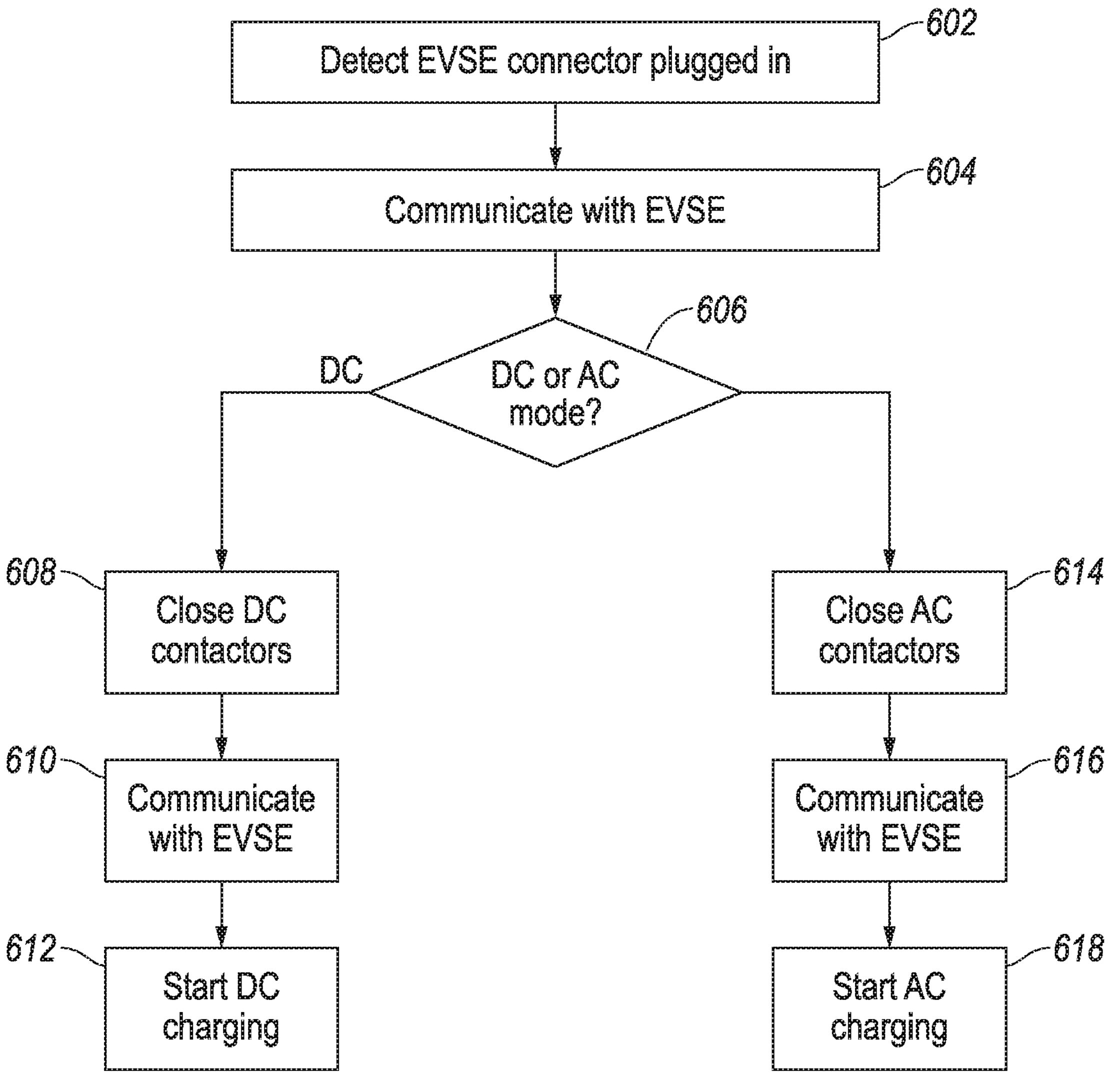
FIG. 6 illustrates a flow diagram of a process for operating the vehicle charging.

Referring to FIG. 6, an example flow diagram of a process 600 for charging the vehicle 112 is illustrated. With continuing reference to FIGS. 1-5, the process 600 may be individually or collectively implemented via system controller 150 and/or BECM 125. For simplicity the following description will be made with reference to the system controller 150. Responsive to detecting the vehicle 112 has been parked and the EVSE connector 140 has plugged into the modified charge port 134 at operation 602, the system controller 150 communicates with the EVSE 138. There are several ways to enable the communication between the system controller 150 and the EVSE 138. For instance, the system controller 150 may establish a wired data communication with the EVSE 138 via the control pilot CS and control status CS pins of the SAE J1722 Type 1 connector as discussed above. Additionally or alternatively, the vehicle 112 may establish a wireless connection with the EVSE 138 via one or more wireless transceivers (not shown) in support of various wireless communication protocols such as Wi-Fi, near-field communication (NFC), Bluetooth or the like. The system controller 150 may communicate with the EVSE 138 and determine the compatibility charging mode supported by the EVSE 138. Different EVSEs 138 may be configured to support different charging modes. For instance, a first EVSE 138 connected to the vehicle 112 may be configured to support DCFC charging while a second EVSE 138 connected to the vehicle 112 may support 3-phase AC charging described above. Based on the charging mode supported by the EVSE 138, at operation 606, the system controller switches between DC and AC charging mode.

If the system controller 150 determines the EVSE 138 supports the DCFC mode, the process proceeds from operation 606 to operation 608 and the system controller 150 commands to close the DC contactors 152 to directly supply the DC current to the traction battery 124 and open the AC contactors 154 to prevent the DC current being supplied to the power conversion module. In one example, both the DC contactors 152 and the AC contactors 154 may be open by default when the vehicle is not being charged. In this case, the system controller 150 may only need to command the DC contactors 152 to close. Responsive to detecting and confirming the DC contactors 152 have been closed, at operation 610, the system controller 150 communicates the contactor status to the EVSE 138 to indicate the vehicle 112 is ready to receive the DC current. In response, the EVSE 138 closes a DCFC contactor and starts to supply DCFC current to the traction battery 124 at operation 612.

If the system controller 150 determines the EVSE 138 supports the 3-phase AC charging mode at operation 606, the process proceeds to operation 614 and the system controller 150 commands to close the AC contactors 154 to supply the 3-phase AC current to the power conversion module 132 and open the DC contactors 152 to separate the modified DC/AC connector 404 from the traction battery 124. At operation 616, responsive to detecting and confirming the AC contactors 154 have been closed, the system controller 150 communicates the contactor status to the EVSE 138 to indicate the vehicle 112 is ready to receive the AC current. At operation 618, the EVSE 138 starts to supply the 3-phase AC current to the vehicle 112.

Additionally or alternatively, the vehicle 112 and/or EVSE 138 may offer the vehicle user with options to select from 2-phase or 3-phase AC charging as well as the corresponding charging power. In some cases, the user may prefer to use the slower 2-phase charging for various reasons such as to extend the life span of the battery 124. Responsive to receiving a user input via an interface, the vehicle 112 and/or EVSE 138 may switch to the corresponding AC charging mode accordingly.

Additionally or alternatively, in the case that the EVSE 138 supports both the DC fast charging mode and the AC 3-phase charging mode, the vehicle 112 and/or the EVSE 138 may offer the user with options to select from the DC or AC charging mode. The different modes of vehicle charging may be associated with different pricing rates. Responsive to receiving a user input via an interface, the vehicle 112 and/or EVSE 138 may switch to the corresponding charging mode accordingly.

Figure 7B:
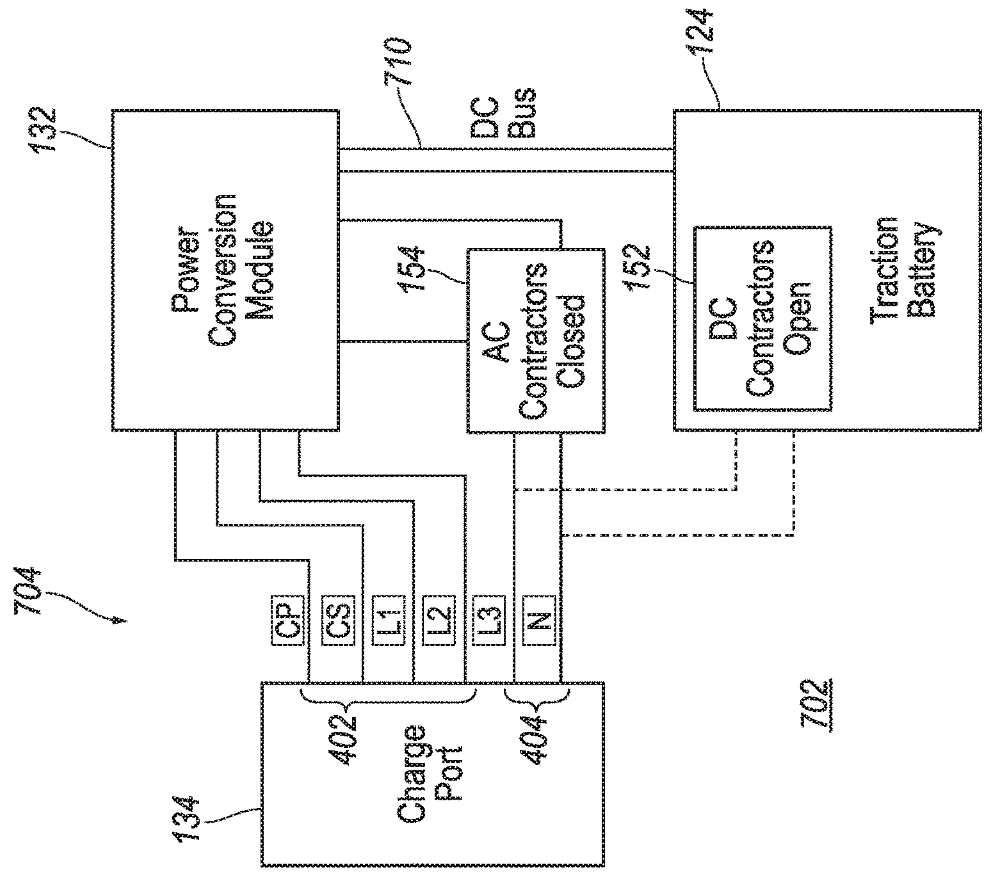
FIGS. 7A and 7B illustrate block diagrams of a AC/DC charging circuit of the vehicle.
Figure 7A:
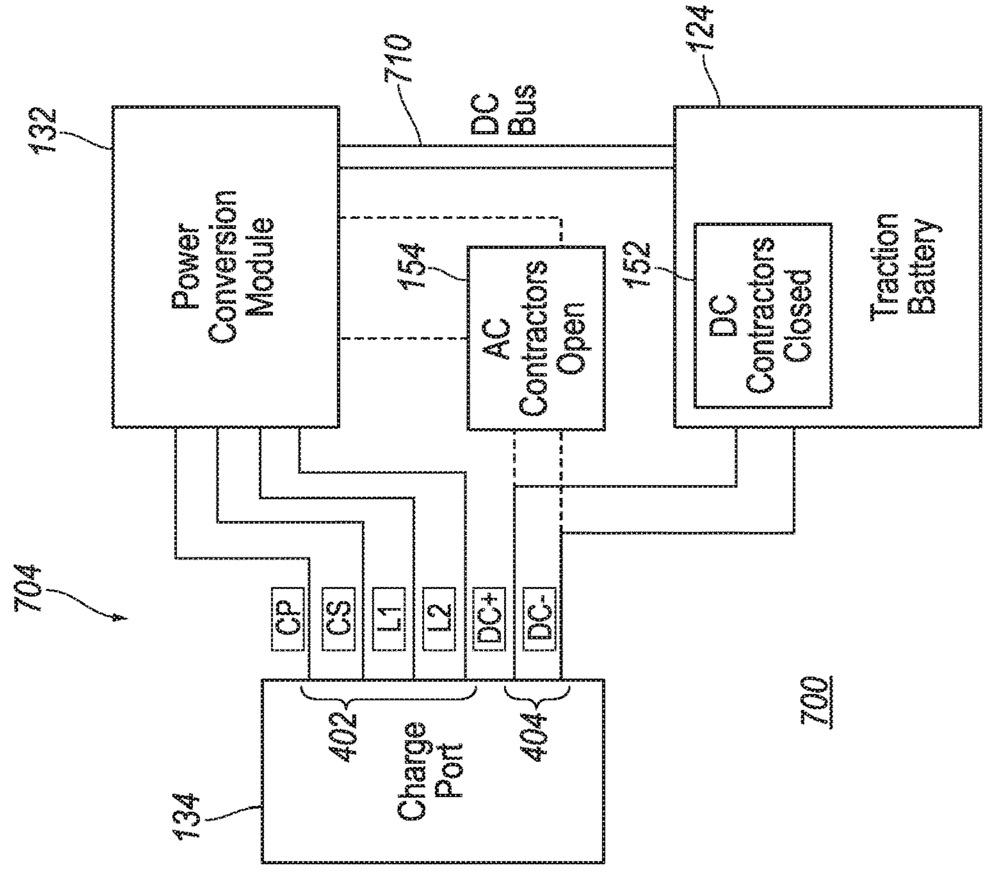

The process 600 may be applied to various circuit configurations of the vehicle. Referring to FIGS. 7A and 7B, block diagrams 700 and 702 of a vehicle AC/DC charging circuit 704 of one embodiment of the present disclosure is illustrated. The first block diagram 700 in FIG. 7A illustrates the vehicle AC/DC charging circuit 704 operating in the DC mode, and the second block diagram 702 in FIG. 7B illustrates the vehicle AC/DC charging circuit 704 operating in the 3-phase AC mode. Referring to FIG. 7A and with continuing reference to FIGS. 1-6, the vehicle AC/DC charging circuit 704 may include various components. For instance, the vehicle AC/DC charging circuit 704 may include a vehicle charge port 134 configured to engage with the EVSE connector 140 once connected.

As discussed above, the charge port 134 may include an AC connector 402 and a modified DC/AC connector 404. The AC connector 402 of the charge port 134 may be directly connected to the power conversion module 132 (onboard charger). More specifically, the first AC line L1, the second AC line L2, the control pilot line CP and the control signal line CS may be directly connected between the charge port 402 and the power conversion module 132 without utilizing a switch or contactor. The modified DC/AC connector 404 may be selectively connected to the power conversion module 132 via the AC contactors 154 and to the traction battery 124 via the DC contactors 152. In the present example, the AC contactors 154 and the DC contactors 152 may be a part of the AC/DC charging circuit 704. It is noted that the DC contactors 152 and the AC contactors 154 may be operated by the controller in a mutually exclusive manner. For instance, when the DC contactors 152 are closed, the AC contactors 154 are configured to open. And vice versus, when the DC contactors 152 are open, the AC contactors 154 are configured to close. Thus, there may not be a situation in which both the DC contactors 152 and the AC contactors 154 are closed at the same time.

Referring to FIG. 7A, the block diagram 700 illustrates a DC charging condition of the AC/DC charging circuit 704 in which the DC contactors 152 are closed connecting the modified DC/AC connector 404 to the traction battery 124 and the AC contactors 154 are open separating the power conversion module 132 from the modified DC/AC connector 404. In this case, the DC/AC connector 404 operates as a DC+ and a DC− line to directly charge the traction battery 124.

Referring to FIG. 7B, the block diagram 702 illustrates an AC charging condition of the AC/DC charging circuit 704 in which the AC contactors 154 are closed connecting the modified DC/AC connector 404 to the power conversion module 132 and the DC contactors 152 are open separating the traction battery 152 from the modified DC/AC connector 404. In this case, the DC/AC connector 404 operates as a third AC line L3 and a neutral line N to supply the AC power to the power conversion module 132. The power conversion module 132 may convert the AC power from the first AC line L1, the second AC line L2, and the third AC line L3 into DC power and supply the DC power to the traction battery 124 via a DC bus 710.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A charge system for a vehicle, comprising:

a Combined Charging System Type 1 charge port including a plurality of terminals, the plurality of terminals including a first DC fast charging terminal and a second DC fast charging terminal; and a switch arrangement operable to, as a result of an AC power source being electrically connected with the terminals, configure the terminals to pass three-phase AC current for an onboard charger of the vehicle, wherein the first DC fast charging terminal is configured as a third AC phase terminal and the second DC fast charging terminal is configured as a neutral terminal during the three-phase AC charging, and as a result of a DC power source being connected with some of the terminals, configure the some of the terminals to pass DC current for a traction battery of the vehicle, wherein the first DC fast charging terminal and the second DC fast charging terminal are configured as positive and negative DC charging terminals, respectively, during the DC charging.

2. The charge system of claim 1, wherein the switch arrangement includes first switches configured to close to complete first electrical paths between the first DC fast charging terminal and the second DC fast charging terminal and the onboard charger.

3. The charge system of claim 2, wherein the switch arrangement includes second switches configured to close to complete second electrical paths between the first DC fast charging terminal and the second DC fast charging terminal and the traction battery.

4. The charge system of claim 3 further comprising a controller programmed to selectively open and close the first and second switches such that the first switches are closed and second switches are open when the AC power source is electrically connected with the terminals.

5. The charge system of claim 4, wherein the controller is further programmed to selectively open and close the first and second switches such that the first switches are open and the second switches are closed when the DC power source is electrically connected with the some of the terminals.

6. The charge system of claim 2, wherein one of the first electrical paths defines a neutral connection and another of the first electrical paths defines a line connection.

7. A vehicle comprising:

a traction battery;

an onboard charger;

a charge port including a plurality of power terminals, the plurality of power terminals including a first DC charging terminal and a second DC charging terminal; and a controller programmed to selectively configure the power terminals to receive three-phase AC power for the onboard charger from an AC power source connected with the charge port, wherein the first DC charging terminal is configured as a third AC phase terminal and the second DC charging terminal is configured as a neutral terminal during three-phase AC charging, and configure the first DC charging terminal and the second DC charging terminal as positive and negative DC charging terminals, respectively, to receive DC power for the traction battery from a DC power source connected with the charge port.

8. The vehicle of claim 7 further comprising switches configured to be closed by the controller to complete electrical paths between the first DC charging terminal and the second DC charging terminal and the onboard charger while the AC power source is connected with the charge port.

9. The vehicle of claim 8, wherein the electrical paths respectively define a neutral connection and a line connection.

10. The vehicle of claim 7 further comprising switches configured to be closed by the controller to complete electrical paths between the first DC charging terminal and the second DC charging terminal and the traction battery while the DC power source is connected with the charge port.

11. The vehicle of claim 7 further comprising a switch arrangement configured to selectively establish electrical paths between the first DC charging terminal and the second DC charging terminal and traction battery, and the first DC charging terminal and the second DC charging terminal and the onboard charger.

12. The vehicle of claim 7, wherein the charge port further includes communication terminals.

13. The vehicle of claim 7, wherein the charge port is a Combined Charging System Type 1 charge port and wherein the first DC charging terminal and the second DC charging terminal are DC fast charging terminals.

14. A method comprising:

responsive to an AC power source being connected to a charge port of a vehicle, the charge port including a plurality of power terminals including a first DC terminal and a second DC terminal, establishing direct electrical paths between power terminals of the charge port and an onboard charger of the vehicle, including configuring the first DC terminal as a third AC phase terminal and configuring the second DC terminal as a neutral terminal for three-phase AC charging; and responsive to a DC power source being connected to the charge port, establishing direct electrical paths between the power terminals and a traction battery of the vehicle, including configuring the first DC terminal and the second DC terminal as positive and negative DC charging terminals, respectively.

15. The method of claim 14, wherein the direct electrical paths between the power terminals and onboard charger define neutral and line connections.

16. The method of claim 14, wherein the charge port is a Combined Charging System Type 1 charge port.

* * * * *